Nov. 7, 1950     G. R. DALE     2,528,865

ENDLESS BELT CONVEYER DRIVE

Filed May 5, 1947

INVENTOR.
George R. Dale
BY
Robt. D. Pearson
ATTORNEY.

Patented Nov. 7, 1950

2,528,865

UNITED STATES PATENT OFFICE 2,528,865

ENDLESS BELT CONVEYER DRIVE

George R. Dale, Los Angeles, Calif.

Application May 5, 1947, Serial No. 745,915

2 Claims. (Cl. 198—203)

1

This invention relates to a drive for an endless belt and to a conveyor unit employing such a belt drive.

The present belt drive is particularly adapted for use with "live rollers conveyors," that is, conveyors wherein the moved article is propelled by the positive movement of rollers over which it passes. These may be contrasted with gravity roller conveyors wherein gravity is the force activating the moved article and the rollers over which it passes are turned only by its passage, thus acting merely as passive roller bearings.

In live roller conveyors, the rollers may be actuated by a chain drive, or as in the present illustration, by a frictional belt drive. In current practice, various means are employed to keep the endless belt taut, such as mounting a weighted roller to press it outward at a designated point so as to take up slack. This is a considerable problem since the amount of slack in a line is constantly changing; for example, a leather belt will expand and contract with changes of atmospheric moisture content.

Accordingly, it is an object of the present invention to provide a belt drive which may be used with complete indifference to the amount of slack in the belt, and without making any compensation for the same.

Another purpose is the provision of tensioning means in said drive which serves to adjust the same for different belt thicknesses.

Other objects and advantages of the invention, now reduced to practice, will be apparent from the following description and claims, the novelty consisting in the features of construction, combination of parts, the unique relations of the members and the relative proportioning, disposition, and operation thereof, all as more completely outlined herein and particularly pointed out in the appended claims.

In the drawings, which form part of the present specification:

2

Figure 1:
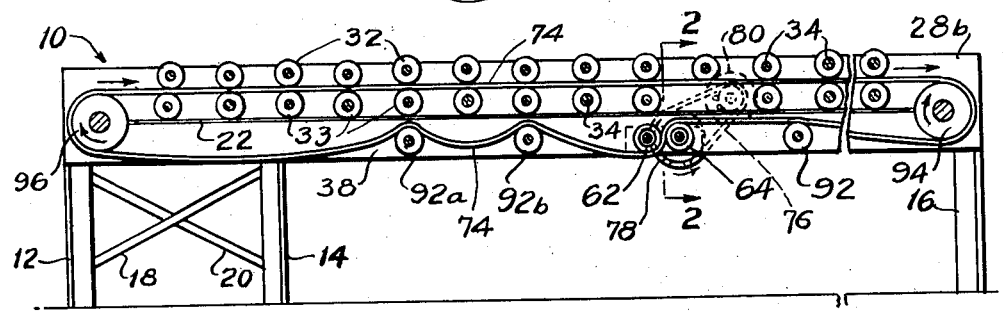
Fig. 1 is a side elevational view of a live roller conveyor embodying my invention, as seen along the line 1—1 of Fig. 2.

In the embodiment of the invention here illustrated, there is shown an enlarged, generally rectangular frame 10 mounted on suitable upright supporting legs 12, 14 and 16, L-shaped in cross section and reinforced by angularly attached cross braces 18 and 20.

A pair of horizontal, flat supporting rails or slats 22 and 24 are disposed along the opposite sides of the frame and have secured to their upper and lower faces respectively, as by bolts 26, outwardly opening angle irons or brackets of which the upper pair 28 and 30 are L-shaped with their bolted footing portions 28a and 30a extending outward and their upright portions 28b and 30b disposed parallel to each other so as to form a channel or guideway, and supporting jointly therebetween two series of transversely mounted, horizontal rollers 32 and 33, the one series vertically spaced above the other with their several axles 34 journaled in corresponding apertures in the sides 28b and 30b of the guideway and secured therein by nuts 36 threadedly mounted on their outer ends.

Figure 2:
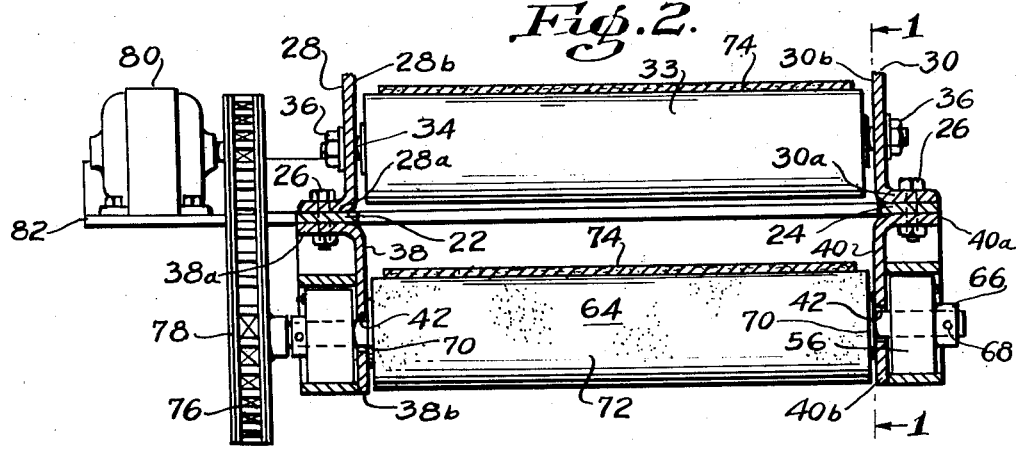
Fig. 2 is a fragmentary transverse sectional view omitting the upper rollers taken through the conveyor along the line 2—2 of Fig. 1.
Figures 3, 4:
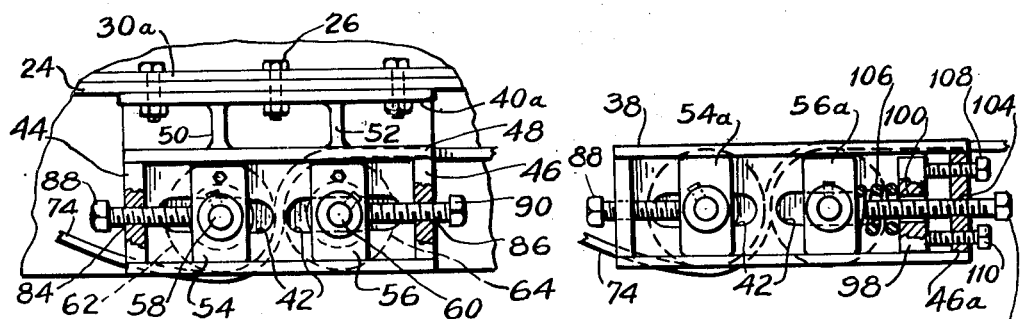
Fig. 3 is an enlarged side elevational view, with parts broken away, of the pair of belt-driving rollers.
Fig. 4 is a view corresponding to Fig. 3 and showing a modified mounting of the driving rollers wherein a resilient tensioning of the belt is provided.

The downwardly extending brackets 38 and 40 are shaped similar to the L-members 28 and 30 above except for an intermediate section of each one which is cup shaped, presenting a generally U section when cut either vertically or horizontally, as seen particularly in Fig. 2. These outwardly opening, housing cups have their top arms 38a and 40a bolted along the bottom of the side rails 22 and 24, and their inner, downwardly extending portions 38b and 40b each provided with a pair of longitudinal slots 42 (Fig. 3).

Each housing cup 38 and 40 is provided with end walls 44 and 46 and with a horizontal partition 48 spaced below the top thereof by vertical struts 50 and 52. Slidably mounted within the cup below the partition 48 are a pair of bearing blocks 54 and 56, each centrally apertured to receive therethrough the axle shaft 58 or 60 of a roller 62 or 64 which pair of rollers are laterally spaced apart and suspended between the opposite housing cups with their shafts projecting through the slots 42 therein. On the outer ends of each axle, beyond the sliding blocks 54, 56, an annular collar 66 is mounted thereon by a radial set screw 68 traversing the collar and seating against the shaft.

These two rollers 62 and 64 each have a metal disk 70 fixed to each end of their body portion and formed of greater diameter than the height of the adjacent slots 42, so as to form a protective guard or bearing surface in the event of sliding engagement with the adjacent inner cup face 38b or 40b. In contrast, the outer peripheral portions 72 of the rollers are formed of cork, rubber or other material adapted to frictionally engage an endless belt 74 disposed between the pair of laterally spaced rollers 62 and 64 which are thus arranged to press against the belt from either side, as will shortly be evident.

One of this pair of rollers is a driving roller (64) and for this purpose is provided with an outer sprocket 76 which is engaged by a link pulley 78. The pulley is operated by suitable means such as a motor 80 mounted on an outwardly projecting, horizontal extension 82 of the side rail 22. The other roller (62) is an idler. Each end wall 44 and 46 of the opposite cup housing 38 and 40 is provided with a tapped aperture 84 and 86 through which is threadedly inserted an adjusting screw 88 and 90, respectively, which bears against the center of the outer face of the sliding bearing block 54 or 56, whereby the lateral displacement of the two rollers 62 and 64 from each other may be regulated by movement of their mounting blocks. Thus, by tightening up these screws, the grip of the two rollers on the belt can be increased to compensate for wear or shrinkage or to overcome slipping of the belt.

The endless belt 74, which is thus drawn between the engaging rollers 62 and 64 is pulled, in turn, over a lower idler roller 92 and an enlarged end roller 94, and then between the two series of live rollers 32 and 33 which are spaced apart by the thickness of the belt and accordingly are both rotated by movement of the belt. It is thus evident that a carton or other article placed upon the carrying rollers 32 will be conveyed along the guideway to one end or the other, depending upon which direction the belt is moved.

It will be apparent, of course, that either or both of the roller series 32 and 33 could be eliminated and the article moved, for example, by the belt directly, either with an idler supporting roller (33) or not; or the carrying rollers 32 could be used with the belt in the absence of the supporting rollers. In the present illustration, the supporting rollers 33 are employed principally to maintain the belt taut against the upper carrying rollers.

At the opposite end of the channel the belt passes over another enlarged end roller 96 and then underneath the frame to return to the pair of actuating rollers 62 and 64. It will be noted in this connection, that slack in the belt will accumulate along the outlet side of the two drive rollers, being draped over 92a and 92b, while the belt moving along the top of the channel is kept taut by the pull of the pair of actuating rollers 62, 64. Thus no precautions need be resorted to, as in prior constructions, to prevent or compensate for slackness in the belt, the only adjustment required being that of maintaining the tension between the pair of driving pulleys by means of the screws 88 and 90.

A modified form of tensioning adjustment of the two rollers 62, 64 is shown in Fig. 4 wherein the bearing blocks 54a and the bearing blocks 56a are slidable as before. Also slidably mounted in the housing, between the adjustable bearing block 56a and the adjacent housing end 46a is a vertical plate 98, disposed parallel to the block and having a central opening 100 drilled therethrough. An adjustable stop screw 102 is threadedly mounted in a tapped aperture 104 of the housing end 46a and then freely inserted through the drilled opening 100 of the sliding plate. Ordinarily the spring 106 maintains a clearance between the block 56a and the inner end of said screw, but the spring may be compressed to such an extent as to allow the block to contact the screw, the latter at such times performing a valuable function as a stop.

Circumposed on the end of the adjusting screw is a resilient coil, or helix, spring 106 which thus presses against the block 56a and the sliding plate 98. The plate is in turn adjustable by means of two set screws 108 and 110 which are threadedly inserted through the end housing 46a and bear against the outer face of the sliding plate 98. By this construction, it will be seen, the resilient tension of the spring 106 is imposed on the movable bearing block 56a and the amount of resilience is further regulated by adjustment of the sliding plate 98 by the two positioning screws 108 and 110.

While I have shown and described in some detail a presently preferred embodiment of my endless belt drive, it is to be understood that various modifications may be made in the construction and operation thereof within the scope of the subsequently claimed invention which is to be construed broadly and limited only by the prior art.

I claim:

1. A live roller conveyor including in combination: a supporting frame having an elongated guideway formed therein; a series of rollers transversely mounted along said guideway; an endless belt adapted to actuate said rollers by frictional engagement therewith; a pair of rollers laterally spaced apart on opposite sides of said belt so as to frictionally engage it therebetween, at least one of said pair of rollers having an axle projecting from each end and inserted through a longitudinal slot formed in each side of said frame; an opposing pair of reciprocable bearing blocks apertured to receive the ends of said axle therein; an adjustable stop screw disposed at times to bear against each of said bearing blocks whereby the spacing of said blocks and their roller from the adjacent roller of said pair is limited; driving means operatively connected to one of said pair of rollers, an apertured plate spaced from each of said blocks and freely slidable over its respective regulating screw, a coil spring circumposed on each of said screws and bearing respectively against said block and its adjacent plate, and other adjusting means adapted to regulate the displacement of each of said plates from its adjacent block.

2. A live roller conveyor including in combination: a supporting housing having an elongated guideway formed therein; a series of rollers transversely mounted along said guideway; an endless belt adapted to actuate said rollers by frictional engagement therewith; a pair of rollers laterally spaced apart on opposite sides of said belt so as to frictionally engage it therebetween; driving means operatively connected to one of said pair of rollers; adjustable tensioning means adapted to regulate the displacement of said rollers from each other, whereby belts of different thickness may be moved by the driving member of said pair of rollers, said adjustable tensioning means comprising a pair of reciprocable mounting blocks suspending one of said rollers between them, a slidable plate spaced apart from each of said blocks guide means for said plate wherein it is movable in the same plane as the block toward and away therefrom, a resilient spring means disposed between each of said blocks and its adjacent plate so as to urge them apart, and adjusting elements adapted selectively to space each of said blocks and their adjacent plates in relation to each other whereby the tension of said spring means upon its sliding block is regulated, said adjusting elements comprising an outer end portion of said housing and a pair of substantially horizontal adjusting screws extending through threaded bores in said end portion of said housing, said screws having inner ends bearing against said plate and having outer headed ends accessible outside said housing.

GEORGE R. DALE.

REFERENCES CITED

The following references are of record in the file of this patent:

UNITED STATES PATENTS

| Number | Name | Date |
|---|---|---|
| 1,614,816 | York | Jan. 18, 1927 |
| 1,762,772 | Fisher | June 10, 1930 |
| 2,165,759 | Nyborg | July 11, 1939 |
| 2,243,538 | Salfisberg | May 27, 1941 |
| 2,413,339 | Stadelman | Dec. 31, 1946 |